US012667824B2

(12) United States Patent
Kouno et al.

(10) Patent No.: US 12,667,824 B2
(45) Date of Patent: Jun. 30, 2026

(54) CARBON DIOXIDE ABSORBENT

(71) Applicant: MITSUBISHI GAS CHEMICAL COMPANY, INC., Tokyo (JP)

(72) Inventors: Kazuki Kouno, Kanagawa (JP); Yuki Kawashima, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 520 days.

(21) Appl. No.: 18/267,616

(22) PCT Filed: Dec. 14, 2021

(86) PCT No.: PCT/JP2021/045917
§ 371 (c)(1),
(2) Date: Jun. 15, 2023

(87) PCT Pub. No.: WO2022/138302
PCT Pub. Date: Jun. 30, 2022

(65) Prior Publication Data
US 2024/0123425 A1 Apr. 18, 2024

(30) Foreign Application Priority Data
Dec. 22, 2020 (JP) ................................ 2020-212873

(51) Int. Cl.
*B01J 20/26* (2006.01)

(52) U.S. Cl.
CPC .................................. *B01J 20/262* (2013.01)

(58) Field of Classification Search
None
See application file for complete search history.

(56) References Cited

U.S. PATENT DOCUMENTS

| | | | |
|---|---|---|---|
| 4,094,957 | A | 6/1978 | Sartori et al. |
| 4,112,050 | A | 9/1978 | Sartori et al. |
| 2008/0159937 | A1 | 7/2008 | Oumit |
| 2008/0289499 | A1 | 11/2008 | Eisenberger et al. |
| 2014/0127119 | A1 | 5/2014 | Fujimoto et al. |
| 2016/0375399 | A1 | 12/2016 | Park et al. |
| 2017/0304764 | A1 | 10/2017 | Goeppert et al. |
| 2019/0126194 | A1 | 5/2019 | Ingram et al. |

FOREIGN PATENT DOCUMENTS

| | | | | |
|---|---|---|---|---|
| CN | 103596662 | A | 2/2014 | |
| CN | 106268177 | A | 1/2017 | |
| CN | 106660010 | | 5/2017 | |
| JP | 52-062307 | A | 5/1977 | |
| JP | 53-81490 | A | 7/1978 | |
| JP | 2008-13400 | A | 1/2008 | |
| JP | 2008-238073 | A | 10/2008 | |
| JP | 2015-27647 | A | 2/2015 | |
| JP | 2017-031046 | A | 2/2017 | |
| JP | 2017-104776 | A | 6/2017 | |
| JP | 2017-176986 | A | 10/2017 | |
| WO | WO-2013075697 | A1 * | 5/2013 | ......... B01D 53/1425 |

OTHER PUBLICATIONS

International Search Report issued Feb. 15, 2022 in International Bureau of WIPO Patent Application No. PCT/JP2021/045917, along with an English translation thereof.
Written Opinion issued Feb. 15, 2022 in International Bureau of WIPO Patent Application No. PCT/JP2021/045917, along with an English translation thereof.
Kento Fujita et. al, "$CO_2$ absorption effect on the electric conductivities for amine aqueous solution at 313 K", Summary of the 51st Academic Lecture Meeting at the College of Industrial Technology, Nihon University (Dec. 1, 2018). https://www.cit.nihonu.ac.jp/laboratorydata/kenkyu/kouennkai/reference/No.51/pdf/ 4-41.pdf [retrieved Nov. 18, 2025] (machine) English language translation thereof.
Kenji Hanabusa et al., "Gelators Bringing About Gelation and Thickeners Raising Viscosity", Sen'I Gakkaishi (Textiles and Industry), vol. 65, No. 5 (2009). https://www.jstage.jst.go.jp/article/fiber/65/5/65_5_P_159/_article/-char/ja/ [retrieved Nov. 22, 2025] (machine) English language translation thereof.
Yoshiro Yasaka, "Proposal of a new chemical absorption liquid to reduce the cost of carbon dioxide separation and capture", JXTG Technical Review, vol. 59, No. 3. Nov. 2017. https://www.eneos.co.jp/company/rd/technical_review/ vo159.html. [retrieved Nov. 22, 2025] (machine) English language translation thereof.
K. Onda, et al., "Measurement of the Diffusivities of $CO_2$ in Liquids by Liquid Jets", 918-925, Kagaku Kogaku, vol. 24, No. 12, 1960. https://www.jstage.jst.jp/article/kakoronbunshu1953/ 24/12/24_12_918/_pdf retrieved Nov. 22, 2025, with (machine) English language translation thereof.
Office Action, dated Dec. 23, 2025, in Japanese family member application No. 2022-572182, (machine) English language translation thereof (only).

* cited by examiner

*Primary Examiner* — Daniel Berns
(74) *Attorney, Agent, or Firm* — GREENBLUM & BERNSTEIN, P.L.C.

(57) ABSTRACT

A carbon dioxide absorbent containing a polyamine compound (A) having an alicyclic hydrocarbon structure, wherein a content of the polyamine compound (A) is 60% by mass or more.

11 Claims, No Drawings

CARBON DIOXIDE ABSORBENT

TECHNICAL FIELD

The present invention relates to a carbon dioxide absorbent.

BACKGROUND ART

From a viewpoint of global warming issues, there is a need to reduce carbon dioxide.

One of methods for reducing carbon dioxide is technology that effectively captures a high concentration (about 10 to 30% by volume) of carbon dioxide from exhaust gases exhausted from a thermal power plant and so on, and stores it by burying into the ground and the sea (CCS: Carbon dioxide Capture and Storage). The technology regarding carbon dioxide absorbents used in CCS includes, for example, those described in Patent Literatures 1 to 4.

In Patent Literature 1, described is a method for capturing carbon dioxide by using specific alkanolamines as the carbon dioxide absorbent.

In Patent Literature 2, described is that a carbon dioxide absorption liquid containing carbon dioxide chemoabsorbent amines having a nitrogen-hydrogen bond and a tertiary amine solvent not having the nitrogen-hydrogen bond is used as the carbon dioxide absorbent.

In Patent Literature 3, described is a method for removing an acidic gas with a sterically hindered amine and an amino acid.

In Patent Literature 4, described is an acidic gas absorbent containing a diamine compound having a hydroxy alkyl group.

In Patent Literature 5, described is an absorbent of carbon dioxide from the air, containing an alkylamine substituted by a hydroxy group or an amino group which may be substituted.

CITATION LIST

Patent Literature

PTL1: JP 2008-13400 A
PTL2: JP 2017-104776 A
PTL3: JP 53-81490 A
PTL4: JP 2015-27647 A
PTL5: JP 2017-031046 A

SUMMARY OF INVENTION

Technical Problem

In recent years, technology that directly captures a low concentration of carbon dioxide (about 0.04% by volume) from the air (DAC: Direct Air Capture) has gained attention. A carbon dioxide absorbent used in DAC requires a higher carbon dioxide absorption capacity than that of a carbon dioxide absorbent used in CCS.

Here, the carbon dioxide absorbents described in Patent Literatures 1 to 4 have not been fully satisfactory as absorbents for DAC.

Also, according to the present inventors' studies, it has become apparent that there is a room for improvement for the carbon dioxide absorbent described in Patent Literature 5 with respect to a rate of absorption of carbon dioxide from the air.

The present invention was made in view of the above circumstances, and provides a carbon dioxide absorbent having an improved absorption capacity for carbon dioxide from the air.

Solution to Problem

The present inventors made intensive studies in order to solve the above problem. As a result, they have found that a carbon dioxide absorbent comprising a specific amount of a polyamine compound (A) having an alicyclic hydrocarbon structure can improve the absorption capacity for carbon dioxide from the air, and have completed the present invention.

That is, according to the present invention, the following carbon dioxide absorbent is provided.

[1]

A carbon dioxide absorbent comprising a polyamine compound (A) having an alicyclic hydrocarbon structure, a content of the polyamine compound (A) being 60% by mass or more.

[2]

The carbon dioxide absorbent according to the above [1], wherein the polyamine compound (A) is a compound represented by the following formula (1), (1)

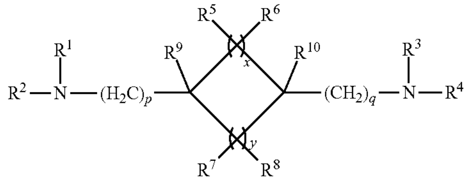

wherein $R^1$ to $R^4$ each independently represents a hydrogen atom or a hydrocarbon group having 1 or more and 10 or less carbon atoms, and optionally having at least one substituent selected from the group consisting of an amino group, a cyano group and a phenyl group; $R^5$ to $R^{10}$ each independently represents a hydrogen atom or a hydrocarbon group having 1 or more and 4 or less carbon atoms; x and y each independently represents an integer of 0 or more and 6 or less; x+y is 1 or more and 6 or less; and p and q each independently represents an integer of 0 or more and 4 or less.

[3]

The carbon dioxide absorbent according to the above [1] or [2], wherein a maximum carbon dioxide release temperature of the polyamine compound (A) is 140° C. or less measured by the following method:

heating the polyamine compound (A) with carbon dioxide absorbed from 23° C. to 250° C. at 10° C./minute of a heating rate, measuring a temperature at which an endothermic amount associated with desorption of carbon dioxide reaches a maximum, and letting the temperature be the maximum carbon dioxide release temperature.

[4]

The carbon dioxide absorbent according to any one of the above [1] to [3], wherein an acid dissociation constant (pKa) of the polyamine compound (A) is 8.0 or more and 12.0 or less.

[5]

The carbon dioxide absorbent according to any one of the above [1] to [4], wherein a molecular weight of the polyamine compound (A) is 140 or more and 1,000 or less.

[6]

The carbon dioxide absorbent according to any one of the above [1] to [5], wherein a maximum endothermic temperature of the polyamine compound (A) is 130° C. or more and 300° C. or less measured by the following method:

heating the polyamine compound (A) from 23° C. to 350° C. at a 10° C./minute of a heating rate, measuring a temperature at which an endothermic amount associated with volatilization of the polyamine compound (A) reaches a maximum, and letting the temperature be the maximum endothermic temperature of the polyamine compound (A).

[7]

The carbon dioxide absorbent according to any one of the above [1] to [6], wherein an amine value of the polyamine compound (A) is 500 mgKOH/g or more and 1,500 mgKOH/g or less.

[8]

The carbon dioxide absorbent according to any one of the above [1] to [7], wherein number of amino groups in the polyamine compound (A) is 2 or more and 6 or less.

[9]

The carbon dioxide absorbent according to any one of the above [1] to [8], wherein the alicyclic hydrocarbon structure comprises at least one selected from the group consisting of a 5-membered ring and a 6-membered ring.

[10]

The carbon dioxide absorbent according to any one of the above [1] to [9], wherein the polyamine compound (A) comprises at least one selected from the group consisting of bis(aminomethyl)cyclohexane and derivatives thereof, limonene diamine and derivatives thereof, and isophoronediamine and derivatives thereof.

[11]

The carbon dioxide absorbent according to any one of the above [1] to [10], wherein a content of water is 30% by mass or less.

[12]

The carbon dioxide absorbent according to any one of the above [1] to [11], which is used for directly absorbing carbon dioxide from the air.

Advantageous Effects of Invention

According to the present invention, a carbon dioxide absorbent having an improved absorption capacity for carbon dioxide from the air can be provided.

DESCRIPTION OF EMBODIMENTS

Embodiments of the present invention (hereinafter, simply referred to as "the present embodiments") will be described in detail. The following embodiments are examples to explain the present invention and do not limit the contents of the present invention. The present invention can be implemented with appropriate modifications within the scope of the invention. In the present embodiments, it is considered that provisions that are preferred can be adopted arbitrarily, and combinations of preferred ones are more preferred. In the present embodiments, description of "XX to YY" means "XX or more and YY or less".

A carbon dioxide absorbent of the present embodiments comprises a polyamine compound (A) having an alicyclic hydrocarbon structure, and a content of the polyamine compound (A) is 60% by mass or more. Here, in the present embodiments, the alicyclic hydrocarbon structure refers to a saturated or unsaturated ring structure composed of carbon and hydrogen atoms that has no aromaticity, and a heterocyclic structure containing hetero atoms in the ring is excluded.

Also, the polyamine compound (A) having the alicyclic hydrocarbon structure may be any of a cis-isomer, a trans-isomer or a mixture of the cis-isomer and the trans-isomer.

The carbon dioxide absorbent of the present embodiments comprises a specific amount of the polyamine compound (A) and is an absorbent having an improved absorption capacity for carbon dioxide from the air. The carbon dioxide absorbent of the present embodiments is also excellent in repeated usability.

"Improved absorption capacity for carbon dioxide from the air" in the present embodiments means that the amine compound has a faster absorption rate for carbon dioxide at a low concentration (about 0.04% by volume) from the air and further a larger amount of carbon dioxide absorbed, as compared with other amine compounds at comparable concentrations in carbon dioxide absorbents. In addition, "excellent in the repeated usability" in the present embodiments means that when cycle tests of absorption and release of carbon dioxide are performed, weight loss and reduction in carbon dioxide absorption capacity are unlikely to occur.

The carbon dioxide absorbent of the present embodiments comprises the specific amount of the polyamine compound (A) having the alicyclic hydrocarbon structure. By comprising the specific amount of the polyamine compound (A), the absorption capacity for carbon dioxide from the air and the repeated usability can be improved. The reason thereof is not certain, but is considered to be as follows.

First, since the polyamine compound (A) having the alicyclic hydrocarbon structure has a structure with a large steric hindrance, it is considered that the reaction heat is low and the absorption rate of carbon dioxide is fast during the absorption of carbon dioxide. Furthermore, the polyamine compound (A) having the alicyclic hydrocarbon structure is considered to absorb a large amount of carbon dioxide, because it is strongly basic and contains a plurality of amino groups in its molecule.

Further, the polyamine compound (A) having the alicyclic hydrocarbon structure has the structure with the large steric hindrance and thus is excellent in performance for releasing carbon dioxide. Furthermore, the polyamine compound (A) having the alicyclic hydrocarbon structure has a relatively large molecular weight, and thus is unlikely to undergo oxidation reaction and weight loss even in heat treatment to release carbon dioxide. Therefore, the polyamine compound (A) having the alicyclic hydrocarbon structure is considered to be excellent in the repeated usability. Acyclic aliphatic amines are considered to be inferior in the repeated usability because they are prone to a cyclization reaction, an oxidation reaction, weight loss, etc., upon the heating treatment.

For the above reasons, it is considered that the carbon dioxide absorbent of the present embodiments can improve the absorption capacity for carbon dioxide from the air and the repeated usability.

The carbon dioxide absorbent of the present embodiments can be suitably used for the technology of directly absorbing carbon dioxide (DAC) from the air because it can improve the absorption capacity for carbon dioxide from the air.

In addition, the carbon dioxide absorbent of the present embodiments can be suitably used, for example, in case of capturing carbon dioxide at a low concentration of 0.01% by volume or more and 1% by volume or less.

The alicyclic hydrocarbon structure of the polyamine compound (A) preferably comprises at least one selected from the group consisting of a 5-membered ring and a 6-membered ring from a viewpoint of further improving the absorption capacity for carbon dioxide from the air and the repeated usability, and more preferably comprises the 6-membered ring.

The alicyclic hydrocarbon structure of the polyamine compound (A) includes, for example, a cyclopropane ring, a cyclobutane ring, a cyclopentane ring, a cyclohexane ring, a cycloheptane ring, a cyclooctane ring. Among the above ring structures, the cyclopentane ring and the cyclohexane ring are preferable, the cyclohexane ring is more preferable, and a 1,3-substituted cyclohexane ring is even more preferable.

Number of amino groups in the polyamine compound (A) is preferably 2 or more and 6 or less, more preferably 2 or more and 4 or less, even more preferably 2 or more and 3 or less, and still more preferably 2, from the viewpoint of further improving the absorption capacity for carbon dioxide from the air and the repeated usability.

As the amino groups, an amino group having a nitrogen-hydrogen bond is preferable and a primary amino group is more preferable, from the viewpoint of further improving the amount of carbon dioxide absorbed from the air.

More specifically, the polyamine compound (A) is preferably a compound shown in the following formula (1).

(1)

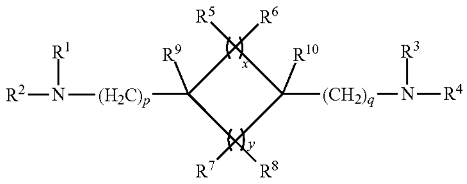

In the above formula (1), $R^1$ to $R^4$ each independently represents a hydrogen atom or a hydrocarbon group having 1 or more and 10 or less of carbon atoms, and optionally having at least one substituent selected from the group consisting of an amino group, a cyano group and a phenyl group; $R^5$ to $R^{10}$ each independently represents a hydrogen atom or a hydrocarbon group having 1 or more and 4 or less carbon atoms; x and y each independently represents an integer of 0 or more and 6 or less; x+y is 1 or more and 6 or less; and p and q each independently represents an integer of 0 or more and 4 or less.

$R^1$ to $R^4$ each independently represents the hydrogen atom, or the hydrocarbon group having 1 or more and 10 or less carbon atoms, and optionally having at least one substituent selected from the group consisting of the amino group, the cyano group and the phenyl group, preferably the hydrogen atom, or an alkyl group having 1 or more and 4 or less carbon atoms, and optionally having at least one substituent selected from the group consisting of the amino group, the cyano group and the phenyl group, more preferably the hydrogen atom, or the alkyl group having 1 or more and 4 or less carbon atoms, and optionally having at least one substituent selected from the group consisting of the amino group and the cyano group, even more preferably the hydrogen atom or the alkyl group having 2 or more and 4 or less carbon atoms, and optionally having at least one substituent selected from the group consisting of the amino group and the cyano group.

The number of carbon atoms of the hydrocarbon groups of $R^1$ to $R^4$ is each independently 1 or more, preferably 2 or more, and 10 or less, preferably 5 or less, more preferably 4 or less, and even more preferably 3 or less.

$R^5$ to $R^{10}$ each independently represents the hydrogen atom or the hydrocarbon group having 1 or more and 4 or less carbon atoms, preferably the hydrogen atom or the alkyl group having 1 or more and 4 or less carbon atoms, more preferably the hydrogen atom or the alkyl group having 1 or more and 3 or less carbon atoms, even more preferably the hydrogen atom or a methyl group, and still more preferably the hydrogen atom.

The hydrocarbon groups of $R^5$ to $R^{10}$ have each independently 1 or more and 4 or less carbon atoms, preferably 1 or 2, and more preferably 1.

p and q each independently represents 0 or more, preferably 1 or more, and 4 or less, preferably 2 or less, more preferably 1. Also, at least one of p and q is preferably 1 or more, and 4 or less, preferably 2 or less, more preferably 1.

x and y each independently represents the integer of 0 or more and 6 or less, and x+y is 1 or more and 6 or less. From the viewpoints of enlarging the steric hindrance of the whole molecule and further improving the absorption capacity for carbon dioxide from the air, x+y is preferably 2 or more, more preferably 3 or more, and even more preferably 4 or more, and from the viewpoint of improving the amount of carbon dioxide absorbed, preferably 5 or less, and more preferably 4. That is, the alicyclic hydrocarbon structure is preferably the 5-membered ring or the 6-membered ring, and more preferably the 6-membered ring. When x+y is 4, preferably x is 1 and y is 3.

As the polyamine compound (A), from the viewpoint of further improving the absorption capacity for carbon dioxide from the air and the repeated usability, preferable is at least one selected from the group consisting of bis(aminomethyl)cyclohexane and derivatives thereof, limonene diamine and derivatives thereof, and isophoronediamine and derivatives thereof, more preferable are bis(aminomethyl)cyclohexane and derivatives thereof, even more preferable are 1,3-bis(aminomethyl)cyclohexane and derivatives thereof, still more preferable is a derivative of 1,3-bis(aminomethyl)cyclohexane, and yet more preferable is a derivative of 1,3-bis(aminomethyl)cyclohexane shown by the following formula (2) or formula (3).

Here, the derivative of the bis(aminomethyl)cyclohexane, the derivative of the limonene diamine or the derivative of the isophoronediamine includes, for example, a compound in which at least one of hydrogen atoms in the amino group is substituted by the hydrocarbon group having 1 or more and 10 or less carbon atoms, optionally having at least one substituent selected from the group consisting of the amino group, the cyano group and the phenyl group, preferably the alkyl group having 1 or more and 4 or less carbon atoms, and optionally having at least one substituent selected from the group consisting of the amino group, the cyano group and the phenyl group, more preferably the alkyl group having 1 or more and 4 or less carbon atoms, and optionally having at least one substituent selected from the group consisting of the amino group and the cyano group, even more preferably the alkyl group having 2 or more and 4 or less carbon atoms, and optionally having at least one substituent selected from the group consisting of the amino group and the cyano group.

(2)

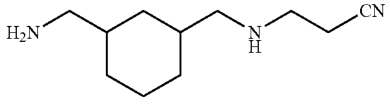

-continued (3)

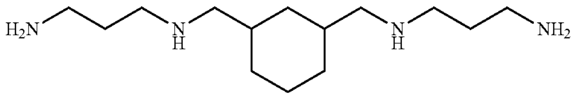

These polyamine compounds (A) can be used alone or in combination of two or more.

The content of the polyamine compound (A) in the carbon dioxide absorbent of the present embodiments is, from the viewpoint of improving the absorption capacity for carbon dioxide from the air and the repeated usability, 60% by mass or more, preferably 70% by mass or more, more preferably 75% by mass or more, even more preferably 80% by mass or more, still more preferably 85% by mass or more, yet more preferably 90% by mass or more, even much more preferably 95% by mass or more, still much more preferably 98% by mass or more, and preferably 100% by mass or less, when a total amount of the carbon dioxide absorbent is 100% by mass.

Further, the content of the polyamine compound (A) in the carbon dioxide absorbent of the present embodiments is, from the viewpoint of improving the absorption capacity for carbon dioxide from the air and the repeated usability, preferably 50 parts by mass or more, more preferably 60 parts by mass or more, even more preferably 70 parts by mass or more, still more preferably 80 parts by mass or more, yet more preferably 90 parts by mass or more, even much more preferably 95 parts by mass or more, and preferably 100 parts by mass or less, when a total amount of the amine compounds contained in the carbon dioxide absorbent is 100 parts by mass.

A content of water in the carbon dioxide absorbent of the present embodiments is, from the viewpoint of improving the absorption capacity for carbon dioxide from the air and the repeated usability, preferably 30% by mass or less, more preferably 25% by mass or less, even more preferably 20% by mass or less, still more preferably 15% by mass or less, yet more preferably 10% by mass or less, even much more preferably 5% by mass or less, still much more preferably 1% by mass or less, yet much more preferably 0.5% by mass or less, even still much more preferably 0.1% by mass or less, even yet much more preferably 0.01% by mass or less, and it is even still yet much more preferable that the carbon dioxide absorbent of the present embodiments is substantially free of water. Here, "substantially free of water" means that water is not intentionally added and does not exclude the presence of a small amount of water as an impurity.

A maximum carbon dioxide release temperature of the polyamine compound (A) measured by the following method is, from the viewpoints of improving the performance for releasing carbon dioxide and further improving the repeated usability, preferably 140° C. or less, more preferably 130° C. or less, even more preferably 120° C. or less, still more preferably 110° C. or less, and yet more preferably 100° C. or less. A lower limit value of the above maximum carbon dioxide release temperature is not limited, but is, e.g., 40° C. or more.

(Method)

The polyamine compound (A) is heated with carbon dioxide absorbed from 23° C. to 250° C. at 10° C./minute of a heating rate, and a temperature at which an endothermic amount associated with desorption of carbon dioxide reaches a maximum is measured, and this temperature is taken as the maximum carbon dioxide release temperature.

Here, the polyamine compound (A) with carbon dioxide absorbed can be prepared, for example, by allowing 5 mmol of the polyamine compound (A) to stand in the air at 23° C. and 50% RH for 24 hours.

An acid dissociation constant (pKa) of the polyamine compound (A) is preferably 8.0 or more, more preferably 9.0 or more, and even more preferably 9.3 or more, from the viewpoint of further improving the absorption capacity for carbon dioxide from the air, and preferably 12.0 or less from the viewpoints of improving the performance for releasing carbon dioxide and further improving the repeated usability.

In the present embodiments, the acid dissociation constant of the polyamine compound (A) is a value obtained by the following measurement method based on an acid-base titration method.

(1) Dissolving 0.2 g of the polyamine compound (A) in 30 mL of purified water.

(2) Calculating the acid dissociation constant (pKa) by titrating the solution obtained in the above (1) with 0.1 N perchloric acid-acetic acid solution using an automatic potentiometric titrator (for example, AT-610 produced by Kyoto Electronics Manufacturing Co., Ltd.).

Still, let a temperature at a time of measurement be 25±2° C.

The molecular weight of the polyamine compound (A) is, from the viewpoints of suppressing weight loss in heat treatment to release carbon dioxide and further improving the repeated usability, preferably 140 or more, more preferably 150 or more, even more preferably 160 or more, still more preferably 180 or more, and from the viewpoint of further improving the absorption capacity for carbon dioxide from the air, preferably 1,000 or less, more preferably 500 or less, even more preferably 300 or less, still more preferably 250 or less, yet more preferably 220 or less.

A maximum endothermic temperature of the polyamine compound (A) measured by the following method is, from the viewpoints of suppressing the weight loss in heat treatment to release carbon dioxide and further improving the repeated usability, preferably 130° C. or more, more preferably 150° C. or more, even more preferably 160° C. or more, still more preferably 180° C. or more, yet more preferably 200° C. or more, even much more preferably 220° C. or more, and from the viewpoint of further improving the absorption capacity for carbon dioxide from the air, preferably 300° C. or less, more preferably 280° C. or less, even more preferably 260° C. or less.

(Method)

Heating the polyamine compound (A) from 23° C. to 350° C. at 10° C./minute of the heating rate, measuring a temperature at which an endothermic amount associated with the volatilization of the polyamine compound (A) reaches a maximum, and letting this temperature be the maximum endothermic temperature of the polyamine compound (A).

An amine value of the polyamine compound (A) is, from the viewpoint of further improving the absorption capacity for carbon dioxide from the air and the repeated usability, preferably 500 mgKOH/g or more, more preferably 550 mgKOH/g or more, and preferably 1,500 mgKOH/g or less, more preferably 1,200 mgKOH/g or less, even more preferably 1,000 mgKOH/g or less, still more preferably 900 mgKOH/g or less. The amine value indicates an amount of the amine in the compound and is number of mg of potassium hydroxide (KOH) of an equivalent amount to acid required to neutralize 1 g amount of the compound.

The amine value can be measured by the following method in accordance with JIS K7237-1995.

(1) Dissolving 0.1 g of the polyamine compound (A) in 20 mL of acetic acid.

(2) Calculating the amine value by titrating the solution obtained in the above (1) with the 0.1 N perchloric acid-acetic acid solution using the automatic potentiometric titrator (for example, AT-610 produced by Kyoto Electronics Manufacturing Co., Ltd.).

The carbon dioxide absorbent of the present embodiments may comprise a component other than the polyamine compound (A), as appropriate, to the extent that the effect of the invention is not impaired. Examples of components other than the polyamine compound (A) includes a compound other than the polyamine compound (A) that can absorb carbon dioxide (e.g., methanol, polyethylene glycol or the like), water, an organic solvent, a degradation inhibitor, a defoaming agent, a viscosity adjuster, an antioxidant, and a desiccant for removing moisture (magnesium sulfate, molecular sieves or the like).

The organic solvent includes, for example, alcohol, dimethylacetamide, N-methylpyrrolidone, and dimethylformamide.

EXAMPLES

Hereinafter, the present invention will be described with reference to examples, but the present invention is not limited to the scope of the examples. In the present examples, various measurements and evaluations were performed by the following methods.

(Acid Dissociation Constant (pKa) of Amine Compound)

The acid dissociation constant of the amine compound was determined by the following method.

(1) Dissolving 0.2 g of the amine compound in 30 mL of the purified water.

(2) Calculating the acid dissociation constant (pKa) by titrating the solution obtained in the above (1) with the 0.1 N perchloric acid-acetic acid solution using the automatic potentiometric titrator (AT-610 produced by Kyoto Electronics Manufacturing Co., Ltd.).

Still, let the temperature at the time of measurement be 25±2° C.

(Amine Value of Amine Compound)

The amine value was measured by the following measurement method in accordance with JIS K7237-1995.

(1) Dissolving 0.1 g of the amine compound in 20 mL of the acetic acid.

(2) Calculating the amine value by titrating the solution obtained in the above (1) with the 0.1 N perchloric acid-acetic acid solution using the automatic potentiometric titrator (AT-610 produced by Kyoto Electronics Manufacturing Co., Ltd.).

(Maximum Endothermic Temperature of Amine Compound)

DSC measurements were performed on the amine compounds used in Examples and Comparative Examples to measure the maximum endothermic temperature of the amine compounds as follows. First, a differential scanning calorimetry was performed on the amine compounds using a differential thermogravimetric analyzer (Product Name: DTG-60 produced by Shimadzu Corporation) under conditions of 23 to 350° C. of a measurement temperature range, 10° C./min of a heating rate, and a nitrogen atmosphere. From the DSC curve obtained thereby, the temperature at which the endothermic amount associated with the volatilization of the amine compound reached the maximum was calculated, and the temperature thereof was used as the maximum endothermic temperature of the amine compound.

(Evaluation of Absorption Capacity for Carbon Dioxide from the Air)

A carbon dioxide concentration meter and a petri dish were placed inside an openable desiccator (Internal Dimension: 370 mm×260 mm×272 mm). The amine compound (5 mmol) was then added to the petri dish in the desiccator, a door was immediately closed, and the carbon dioxide concentration in the desiccator was measured over time for 24 hours under an air environment of 23° C. and 50% RH. The initial concentration of carbon dioxide was adjusted to about 400 ppm. Changes of the carbon dioxide concentration in the desiccator 2 and 24 hours after the amine compound was placed in the desiccator are shown in Table 1. Here, it is meant that the greater the change of the carbon dioxide concentration in the desiccator is, the greater the amount of the carbon dioxide absorbed by the carbon dioxide absorbent is.

(Cycle Evaluation)

After the above evaluation of the carbon dioxide absorption capacity was completed, the amine compound was removed from the desiccator, and the amine compound with carbon dioxide absorbed was heated at 100° C. for 1 hour to release the carbon dioxide absorbed and regenerate the amine compound. At this time, weights of the amine compound before and after the heat treatment were measured, and a weight retention (1st time) was calculated.

Then, on the regenerated amine compound, the above evaluation of the carbon dioxide absorption capacity was performed again, and changes of the carbon dioxide concentration in the desiccator were measured after 2 hours and 24 hours (2nd time).

Then, the amine compound was removed from the desiccator, and the amine compound with carbon dioxide absorbed was heated at 100° C. for 1 hour to release carbon dioxide absorbed and regenerate the amine compound again. At this time, the weights of the amine compound before and after the heat treatment were measured, and the weight retention (2nd time) was calculated.

Next, on the regenerated amine compound, the above evaluation of the carbon dioxide absorption capacity was evaluated again, and changes of the carbon dioxide concentration in the desiccator were measured after 2 hours and 24 hours (3rd time).

(Maximum Carbon Dioxide ($CO_2$) Release Temperature of Amine Compound)

After the above evaluation of the carbon dioxide absorption capacity was completed, the amine compound was removed from the desiccator to obtain the amine compound with carbon dioxide absorbed. The DSC measurement was performed on the amine compound with carbon dioxide absorbed as follows, to measure the maximum carbon dioxide release temperature of the amine compound. First, the differential scanning calorimetry was performed on the amine compound using the differential thermogravimetric analyzer (Product Name: DTG-60 produced by Shimadzu Corporation) under the conditions of 23 to 250° C. of a measurement temperature range, 10° C./min of the heating rate, and the nitrogen atmosphere. From the DSC curve obtained thereby, the temperature at which the endothermic amount associated with the desorption of carbon dioxide reached the maximum was calculated, and the temperature thereof was used as the maximum carbon dioxide release temperature of the amine compound.

In Examples and Comparative Examples, the following amine compounds were used.

(Amine Compounds)

1,3-BAC: 1,3-bis(aminomethyl)cyclohexane (produced by Mitsubishi Gas Chemical Company, Inc.)

1,4-BAC (40% by mol of a trans isomer, 60% by mol of a cis-isomer): 1,4-bis(aminomethyl)cyclohexane (produced by Mitsubishi Gas Chemical Company, Inc.)

1,4-BACT (85% by mol of a trans isomer, 15% by mol of a cis-isomer): 1,4-bis(aminomethyl)cyclohexane (produced by Mitsubishi Gas Chemical Company, Inc.)

1,3-BAC-AN: a reaction product of 1:1 (molar ratio) of 1,3-BAC and acrylonitrile (prepared according to the following Synthesis Example 1)

1,3-BAC-BisAP: a hydrogenated product of a reaction adduct of 1:2 (molar ratio) of 1,3-bis(aminomethyl) cyclohexane and acrylonitrile (prepared according to the following Synthesis Example 2)

IPDA: Isophoronediamine (produced by Evonik Industries AG)

LDA: Limonene diamine (prepared according to the following Synthesis Example 3)

MXDA: Meta-xylylenediamine (produced by Mitsubishi Gas Chemical Company, Inc.)

TETA: Triethylenetetramine (produced by Tokyo Chemical Industry Co., Ltd.)

Synthesis Example 1: Preparation of 1,3-BAC-AN

To a round-bottomed flask having an inner volume of 100 mL equipped with a stirrer, a thermometer, an argon inlet tube, a dropping funnel and a cooling tube, 10.0 g of 1,3-bis(aminomethyl)cyclohexane (produced by Mitsubishi Gas Chemical Company, Inc.) was added, and after thorough stirring under the flow of argon, 3.73 g of acrylonitrile (produced by Sigma-Aldrich Co. LLC) was added dropwise over a period of 10 minutes. After completion of dropping, a temperature was raised to 65° C. and held for 1 hour, then cooled to room temperature to obtain 1,3-BAC-AN.

Synthesis Example 2: Preparation of 1,3-BAC-BisAP (1) To the round-bottomed flask having the inner volume of 100 mL equipped with the stirrer, the thermometer, the argon inlet tube, the dropping funnel and the cooling tube, 10.0 g of 1,3-bis(aminomethyl)cyclohexane (produced by Mitsubishi Gas Chemical Company, Inc.) and 20.0 g of 2-propanol (produced by FUJIFILM Wako Pure Chemical Corporation) were added, and after thorough stirring under a flow of argon, 7.5 g of acrylonitrile (produced by Sigma-Aldrich Co. LLC) was added dropwise over a period of 10 minutes. After completion of the dropping, a temperature was raised to 65° C. and held for 1 hour, then cooled to room temperature to obtain a reaction liquid (1).

(2) To a tubular vertical hydrogenation reactor (made of glass, inner diameter of 10 mmϕ), 7.0 g of hydrogenation catalyst (three-leaf type, diameter of 1.2 mmϕ, produced by Johnson Matthey Japan G.K.; HTCCo2000) having 15% by mass of a cobalt content was charged, and after held at 120° C. for 1 hour under a flow of hydrogen, raised to 240° C. and held for 4 hours or longer for reduction and activation. After cooling, 14.8 g of 2-propanol, the above catalyst and all of the reaction liquid (1) were added to an autoclave (capacity of 150 mL, material: SUS316L) equipped with a stirrer and a heater, and a gas phase portion was replaced with hydrogen. After pressurizing to 3.5 MPaG with the hydrogen, the temperature was started to be raised while stirring, and a liquid temperature was brought to 80° C. in 20 minutes, then the pressure was adjusted to 8.0 MPaG. The reaction was then continued for 3 hours while hydrogen was fed as needed to maintain the pressure at 8.0 MPaG under the condition of 80° C. of the liquid temperature. The reaction liquid was completely concentrated under vacuum to obtain 17.5 g of 1,3-BAC-BisAP.

Synthesis Example 3: Preparation of LDA

To a 300 mL autoclave made of stainless steel, 20.0 g (102 mmol) of limonenedialdehyde, 100 g of 1-butanol, and 5 ml of a sponge cobalt catalyst were added (the sponge cobalt catalyst was used after solvent substitution with 1-butanol and removal of the 1-butanol by decantation). Then, after adding 52 g (3,053 mmol) of liquid ammonia, hydrogen was filled up to 2.5 MPa of internal pressure at room temperature, and nitrogen was further filled to adjust the internal pressure to 5.0 MPa. A temperature of the autoclave was raised to 90° C. with stirring, and after reaching 90° C., the reaction was carried out for 3 hours while hydrogen was further filled as needed to bring the internal pressure to 6 MPa (a hydrogen/nitrogen molar ratio=1). After cooling, and after purging hydrogen and ammonia, the reaction liquid was filtered to remove the sponge cobalt catalyst. The reaction liquid obtained was analyzed by gas chromatography and it was confirmed that 19.2 g (97 mmol) of limonene diamine and 0.6 g (3 mmol) of limonene monoamine monoaldehyde were contained. Reduced pressure distillation under a nitrogen atmosphere was then performed using a distillation apparatus equipped with a distillation column filled with Dixon packing and a nitrogen introducing capillary tube. 15.7 g of the desired limonene diamine (purity 99% by mass) was obtained as main distillate.

Examples 1 to 7 and Comparative Examples 1 to 2

In Examples 1 to 7 and Comparative Examples 1 to 2, each of the above evaluations was performed using the carbon dioxide absorbent in which the content of the amine compound shown in Table 1 was 100% by mass. The results obtained are shown in Table 1. Cycle evaluations were performed on Examples 4, 5, and Comparative Example 2. The results obtained are shown in Table 2.

TABLE 1

| | Amine Compound | | | | | | | | Evaluation of $CO_2$ Absorption | |
|---|---|---|---|---|---|---|---|---|---|---|
| | | | Molecular Weight | Maximum $CO_2$ Release Temperature | Maximum Endothermic Temperature | Amine Value [mgKOH/ | | Capacity Changes of $CO_2$ Concentration [ppm] | |
| | Name | Structural Formula | [-] | [° C.] | [° C.] | g] | pKa | 2 h | 24 h |
| Example 1 | 1,3-BAC | 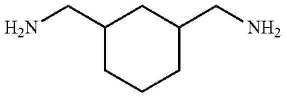 | 142.2 | 125.7 | 160.9 | 789 | 10.8 | 198 | 347 |
| Example 2 | 1,4-BAC | 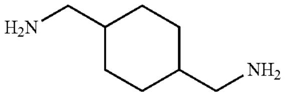 | 142.2 | 135.2 | 155.6 | 789 | 10.9 | 206 | 370 |
| Example 3 | 1,4-BACT | 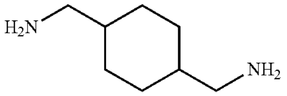 | 142.2 | 130 | 155.9 | 789 | 11.3 | 186 | 371 |
| Example 4 | 1,3-BAC-AN | 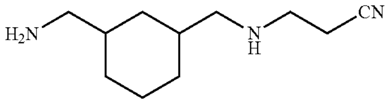 [SMILES: N#CCCNCC1CCCC(CN)C1] | 195.3 (Mixture) | 91.1 | 234.6 | 575 | 10.9 | 213 | 368 |
| Example 5 | 1,3-BAC-BisAP | 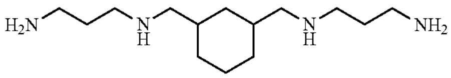 [SMILES: NCCCNCC1CCCC(CNCCCN)C1] | 199.3 | 97.8 | 246.7 | 844 | 9.5 | 193 | 279 |
| Example 6 | IPDA | 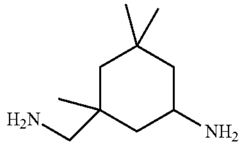 | 170.25 | 114.4 | 168.8 | 659 | 10.4 | 182 | 327 |
| Example 7 | LDA | 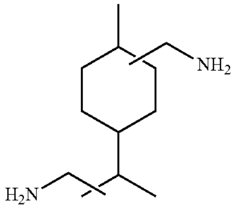 | 198.35 | 58.3 | 209.5 | 566 | 11.6 | 177 | 319 |
| Comparative Example 1 | MXDA | 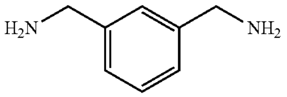 | 136.2 | 135.5 | 183.5 | 824 | 9.5 | 149 | 329 |
| Comparative Example 2 | TETA | 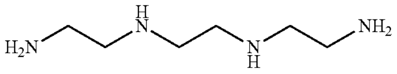 | 146.2 | 69.5 | 184.1 | 1535 | 10.3 | 165 | 294 |

TABLE 2

| | Cycle Test | | | | | | | |
|---|---|---|---|---|---|---|---|---|
| | Weight Retention [%] | | Changes of $CO_2$ Concentration [ppm] 24 hr | | | Changes of $CO_2$ Concentration [ppm] 2 hr | | |
| | 1st Time | 2nd Time | 1st Time | 2nd Time | 3rd Time | 1st Time | 2nd Time | 3rd Time |
| Example 4 | 100 | 100 | 368 | 265 | 192 | 213 | 126 | 119 |
| Example 5 | 100 | 100 | 279 | 323 | 304 | 193 | 118 | 108 |
| Comparative Example 2 | 98 | 95 | 294 | 172 | 46 | 165 | 49 | 10 |

Example 8 and Comparative Example 3

Each of the above evaluations was performed in the same manner as in Example 1, except that the carbon dioxide absorbent was changed to an amine compound aqueous solution having a concentration shown in Table 3. The results obtained are shown in Table 3.

Example 9 and Comparative Example 4

Each of the above evaluations was performed in the same manner as in Example 4, except that the carbon dioxide absorbent was changed to an amine compound aqueous solution having a concentration shown in Table 3. The results obtained are shown in Table 3.

Example 10 and Comparative Example 5

Each of the above evaluations was performed in the same manner as in Example 6, except that the carbon dioxide absorbent was changed to an amine compound aqueous solution having a concentration shown in Table 3. The results obtained are shown in Table 3.

TABLE 3

| | Amine Compound | | Evaluation of $CO_2$ Absorption Capacity Changes of $CO_2$ Concentration [ppm] | |
|---|---|---|---|---|
| | Type | Concentration [% by mass] | 2 h | 24 h |
| Example 1 | 1,3-BAC | 100 | 198 | 347 |
| Example 8 | | 80 | 159 | 368 |
| Comparative Example 3 | | 45 | 86 | 330 |
| Example 4 | 1,3-BAC-AN | 100 | 213 | 368 |
| Example 9 | | 80 | 132 | 353 |
| Comparative Example 4 | | 45 | 76 | 262 |
| Example 6 | IPDA | 100 | 182 | 327 |
| Example 10 | | 80 | 148 | 366 |
| Comparative Example 5 | | 45 | 111 | 414 |

From Tables 1 to 3, it can be seen that the carbon dioxide absorbents of Examples comprising a specific amount of the polyamine compound (A) having the alicyclic hydrocarbon structure have a fast absorption rate for carbon dioxide at a low concentration from the air, and further a larger amount of carbon dioxide absorbed. That is, it can be seen that the carbon dioxide absorbents of the present invention can efficiently absorb carbon dioxide from the air. In contrast, it can be seen that the carbon dioxide absorbents of Comparative Examples have a slower absorption rate for carbon dioxide at a low concentration from the air than those of Examples.

The invention claimed is:

1. A carbon dioxide absorbent comprising a polyamine compound (A) having an alicyclic hydrocarbon structure, wherein a content of the polyamine compound (A) is 60% by mass or more, and wherein a content of water is less than 1% by mass, and wherein the polyamine compound (A) is a compound represented by the following formula (1),

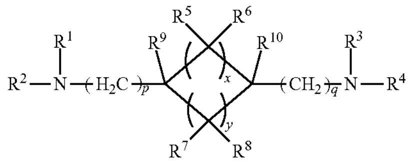

(1)

wherein $R^1$ to $R^4$ each independently represents a hydrogen atom or a hydrocarbon group having 1 or more and 10 or less carbon atoms, and optionally having at least one substituent selected from the group consisting of an amino group, a cyano group and a phenyl group; $R^5$ to $R^{10}$ each independently represents a hydrogen atom or a hydrocarbon group having 1 or more and 4 or less carbon atoms; x and y each independently represents an integer of 0 or more and 6 or less; x+y is 1 or more and 6 or less; and p and q each independently represents an integer of 0 or more and 4 or less.

2. The carbon dioxide absorbent according to claim 1, wherein a maximum carbon dioxide release temperature of the polyamine compound (A) is 140° C. or less as measured by the following method, the method comprising:

heating the polyamine compound (A) with carbon dioxide absorbed from 23° C. to 250° C. at 10° C./minute of a heating rate;

measuring a temperature at which an endothermic amount associated with desorption of carbon dioxide reaches a maximum; and taking the temperature as the maximum carbon dioxide release temperature.

3. The carbon dioxide absorbent according to claim 1, wherein an acid dissociation constant (pKa) of the polyamine compound (A) is 8.0 or more and 12.0 or less.

4. The carbon dioxide absorbent according to claim 1, wherein a molecular weight of the polyamine compound (A) is 140 or more and 1,000 or less.

5. The carbon dioxide absorbent according to claim 1, wherein a maximum endothermic temperature of the polyamine compound (A) is 130° C. or more and 300° C. or less as measured by the following method, the method comprising:

heating the polyamine compound (A) from 23° C. to 350° C. at a 10° C./minute of a heating rate;

measuring a temperature at which an endothermic amount associated with volatilization of the polyamine compound (A) reaches a maximum; and taking the temperature as the maximum endothermic temperature of the polyamine compound (A).

6. The carbon dioxide absorbent according to claim 1, wherein an amine value of the polyamine compound (A) is 500 mgKOH/g or more and 1,500 mgKOH/g or less.

7. The carbon dioxide absorbent according to claim 1, wherein a number of amino groups in the polyamine compound (A) is 2 or more and 6 or less.

8. The carbon dioxide absorbent according to claim 1, wherein the alicyclic hydrocarbon structure comprises at least one selected from the group consisting of a 5-membered ring and a 6-membered ring.

9. The carbon dioxide absorbent according to claim 1, wherein the polyamine compound (A) comprises at least one selected from the group consisting of a bis(aminomethyl) cyclohexane and derivatives thereof, and isophoronediamine and derivatives thereof.

10. The carbon dioxide absorbent according to claim 1, wherein the carbon dioxide absorbent is used for directly absorbing carbon dioxide from the air.

11. The carbon dioxide absorbent according to claim 1, wherein the polyamine compound (A) comprises at least one selected from the group consisting of a bis(aminomethyl) cyclohexane and derivatives thereof.

* * * * *